United States Patent
Cerruti

[11] Patent Number: 6,010,163
[45] Date of Patent: *Jan. 4, 2000

[54] THREADED JOINT FOR CONNECTING TWO PIPES WITH A METAL TO METAL SEAL

[75] Inventor: Sergio Cerruti, Milan, Italy

[73] Assignee: AGIP S.p.A., Milan, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 08/800,524

[22] Filed: Feb. 19, 1997

Related U.S. Application Data

[63] Continuation of application No. 08/570,821, Dec. 12, 1995, abandoned, which is a continuation of application No. 08/320,645, Oct. 11, 1994, abandoned.

[30] Foreign Application Priority Data

Oct. 19, 1993 [IT] Italy .................................. M193A2211

[51] Int. Cl.[7] ................................................... F16L 25/00
[52] U.S. Cl. ........................................... 285/333; 285/390
[58] Field of Search .................................... 285/333, 355, 285/390, 334, 383, 55

[56] References Cited

U.S. PATENT DOCUMENTS

| | | | |
|---|---|---|---|
| 1,927,656 | 9/1933 | Eaton et al. | 285/334 |
| 2,239,942 | 4/1941 | Stone et al. | |
| 2,258,066 | 10/1941 | Oyen | 285/334 |
| 4,153,283 | 5/1979 | Hellmund et al. | 285/334 |
| 4,398,756 | 8/1983 | Duret et al. | 285/383 |
| 4,521,042 | 6/1985 | Blackburn et al. | |
| 4,538,840 | 9/1985 | Delange | 285/333 |
| 4,572,549 | 2/1986 | Sidwell | 285/333 |
| 4,630,849 | 12/1986 | Fukui et al. | 285/55 |
| 4,696,498 | 9/1987 | Church | 285/334 |
| 4,707,001 | 11/1987 | Johnson | 285/334 |
| 4,732,416 | 3/1988 | Dearden et al. | 285/383 |
| 4,750,761 | 6/1988 | Waits | 785/333 |
| 4,984,829 | 1/1991 | Saigo et al. | 285/383 |
| 5,505,502 | 4/1996 | Smith et al. | 285/334 |

FOREIGN PATENT DOCUMENTS 2 521 675  8/1983  France .

OTHER PUBLICATIONS

Drilling and Production Practice 1949; (copyright 1950 by the American Petroleum Institute) Article entitled "Tubing Joints for High–pressure Wells", pp. 381–390, 285/333.

*Primary Examiner*—Eric K. Nicholson
*Attorney, Agent, or Firm*—Oblon, Spivak, McClelland, Maier & Neustadt, P.C.

[57] ABSTRACT

Integral joint for connecting two pipes, in which from the annular edge of the female pipe an internal flaring with decreasing cross-section extends, which gets engaged, with interference, with a corresponding external counter-flaring provided on the end portion of the male pipe nearby the overhanging back shoulder of the latter, in order to create another tight, all-metal sealing with interference, additionally to the other tight sealing already existing at the front end of said end portion of the male pipe.

4 Claims, 1 Drawing Sheet

THREADED JOINT FOR CONNECTING TWO PIPES WITH A METAL TO METAL SEAL

This application is a Continuation of application Ser. No. 08/570,821, filed on Dec. 12, 1995, now abandoned which is a Continuation of application Ser. No. 08/320,645, filed on Oct. 11, 1994, now abandoned.

BACKGROUND OF THE INVENTION

1. Field of the Invention

The present invention relates to an integral butt-joint to connect two pipes which, by realizing between both pipes two distinct metal tight seals with interference engagement activated by the same operation of screwing down of said pipes into each other, makes it possible a tight seal to be accomplished which is effective and reliable even under extremely harsh operating conditions, i.e., high differential pressures and temperatures.

2. Discussion of Background

From the prior art, different types of integral joints, i.e., joints obtained by simply screwing down the pipes to be connected, and therefore with no use of auxiliary organs (sleeves) in order to achieve the mechanical continuity, and the tight seal between the same pipes.

Furthermore, some known types use an all-metal mechanical tight seal with interference between the end of the male pipe and the corresponding seat provided inside the female tube, in which corresponding conical (tapered) surfaces are purposely provided in order to secure the tightness of the joint.

Unfortunately, none of these solutions known from the prior art secures an effective tight seal behaviour when the operating conditions become extremely harsh with high differential pressures, temperatures and tensile/compressive stresses applied to the joint, such as are found in petroleum field, e.g., in well completion.

The purpose of the present invention precisely is of obviating the above drawbacks and therefore supplying an integral joint of two pipes capable of securing always the tightness of the joint under any operating conditions, and, thus, allows a safe and reliable transport of also corrosive liquids, to be accomplished.

SUMMARY OF THE INVENTION

The above purpose is substantially achieved by realizing an all-metal interference tight seal at both ends of the screw-threads of both the male and the female pipe.

In that way, in fact, the double tight seal, besides securing the tightness of the joint also under high, both internal and external, pressures, also performs the task of safeguarding the same tightness also in the case that either of both seals is damaged, which can happen during the screwing down step of both pipes to be connected to each other.

Summing-up, the integral butt joint between the hollow end portion of a female pipe provided with an internal screw thread and the corresponding end hollow portion of a male pipe to be screwed down inside the -end portion of the female pipe, and, for that purpose, provided with an external screw thread; an externally overhanging back shoulder which, when both pieces are fully screwed down into each other, cooperates with the annular edge of said end portion of the female pipe; as well as with a flaring with decreasing cross-section extending from the front end of said end portion of the male pipe, suitable for interfering with a corresponding internal counter-flaring provided inside said end portion of the female pipe in order to create an all-metal interference tight seal, is characterized in that, according to the present invention, from the annular edge of said end portion of the female pipe an internal flaring with decreasing cross-section extends, which is suitable for interfering with a corresponding external counter-flaring provided on said end portion of the male pipe nearby said overhanging back shoulder of the latter, in order to create another tight, all-metal sealing with interference.

BRIEF DESCRIPTION OF THE DRAWINGS

The present invention is better clarified now by referring to the accompanying drawing, which illustrates a preferred embodiment supplied for merely illustrative, non-limitative purposes, because technical or structural modifications can be supplied at any time, without departing from the purview of the present invention.

Figure 1:
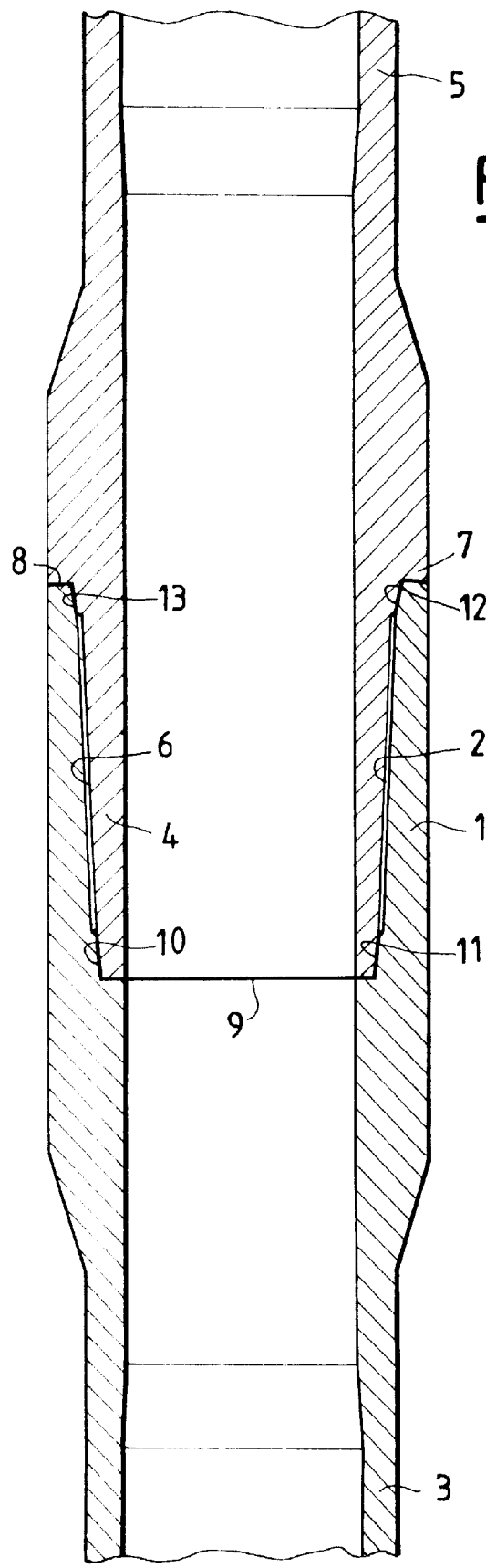
FIG. 1 shows a longitudinal sectional view of an integral butt joint connecting two pipes, accomplished according to the present invention.

Referring to the figures, with 1 the hollow end portion, provided with an internal screw thread 2 of a female pipe 3 is indicated; and with 4, the corresponding hollow end portion of a male pipe 5 is indicated. Said end portion 4 of the male pipe is provided with an external screw thread 6, which allows said portions 1 and 4 to be screwed down into each other, as well as with an externally overhanging back shoulder 7, upstream from said screw thread 6, acting as a edge for the annular edge 8 of said end portion 1 of the female pipe.

Figure 2:
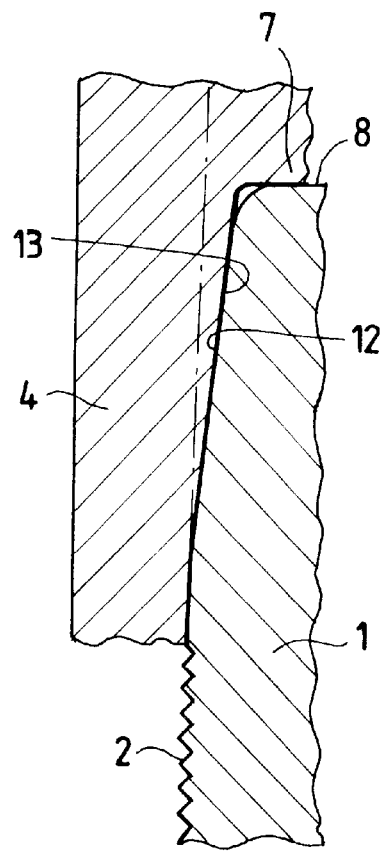
FIG. 2 shows a longitudinal sectional view, on a strongly enlarged scale, of a detail of the joint of FIG. 1.

From the front end 9 of said end portion 4 of the male pipe, a decreasing-cross-section flaring 10 extends which, interfering with a corresponding flaring 11 provided at the internal end of said end portion 1 of the female pipe, creates an all-metal, interference tight seal. Finally, from said annular edge 8 of said end portion 1 of the female pipe an internal, decreasing cross-section flaring 12 extends (see, specifically, FIG. 2) which, by interfering, in its turn, with a corresponding external, increasing cross-section flaring 13, provided on said end portion 4 of the male pipe nearby said overhanging rear shoulder 7, generates a second all-metal, interference tight seal.

In that way, by completely screwing down the end portion 4 of the male pipe into the end portion 1 of the female pipe, a double all-metal interference tight seal 10–11 and 12–13 is generated, which secures the tightness of the seal, whichever the operating conditions may be.

I claim:

1. An integral joint between first and second pipes, wherein said first pipe terminates in a single male terminal portion and said second pipe terminates in a single female terminal portion, wherein:

(a) said male terminal portion comprises a pipe which is provided with an external thread which is tapered along a longitudinal axis of extension at a first angle with respect to a longitudinal axis of said male terminal portion, a first flaring extending from a first end of said external thread to an end of said male terminal portion in a constantly decreasing cross-section terminating in said end of said male terminal portion, and said male terminal portion is further provided with a second flaring extending from a second end of said external thread to a shoulder having an external diameter greater than that of said external thread, at least one of said first and second flarings of said male portion having an outer surface which is tapered at a second angle greater than said first angle, (b) said female terminal portion comprises a pipe which is provided with an internal thread at a third angle substantially equal to said first angle, said internal thread being complementary to said external thread of said male terminal portion which is engaged therewith when said first and second pipe are mated and screwed together, said female terminal portion further comprising a first flaring extending from said internal thread to an end of said female terminal portion, said first flaring of said female portion having an inner surface which is in continuous engagement throughout substantially the entire length thereof with an outer surface of said second flaring of said male portion and having a cross-section which conforms to said second flaring of said male terminal portion, said female terminal portion end being in proximity with said shoulder of said male terminal portion when said internal and external threads are engaged, (c) said female terminal portion further comprising a second flaring having an inner surface which is in continuous engagement throughout substantially the entire length thereof with an outer surface of said first flaring of said male portion and which has a cross-section which conforms to said first flaring of said male terminal portion terminating in a shoulder which is in proximity with said end of said male terminal portion when said internal and external threads are engaged, such that at least one of said first and second flarings of said female terminal portion is tapered at a fourth angle, (d) a single, all-metal interference seal is provided, when said external and internal threads are fully engaged (i), exclusively between said first flaring of said male terminal portion and said second flaring of said female terminal portion and (ii) between said second flaring of said male terminal portion and said first flaring of said female terminal portion, and (e) wherein, when said external and internal threads are fully engaged, (iii) said end of said male terminal portion and said shoulder of said female terminal portion are in proximity with each other and (iv) said shoulder of said male terminal portion and said end of said female terminal portion are in proximity with each other and wherein said integral joint is formed exclusively by a sleeveless connection of said male terminal portion and female terminal portion so as to maintain mechanical continuity.

2. An integral joint as claimed in claim 1 wherein said interference seal is provided at both ends of said threads of said male terminal portion and said female terminal portion.

3. An integral joint as claimed in claim 1, wherein said interference seal comprises a seal securing tightness under internal and external pressures applied thereto.

4. An integral joint as claimed in claim 2, wherein said interference seal comprises a seal securing tightness under internal and external pressures applied thereto.

* * * * *